Patented July 18, 1933

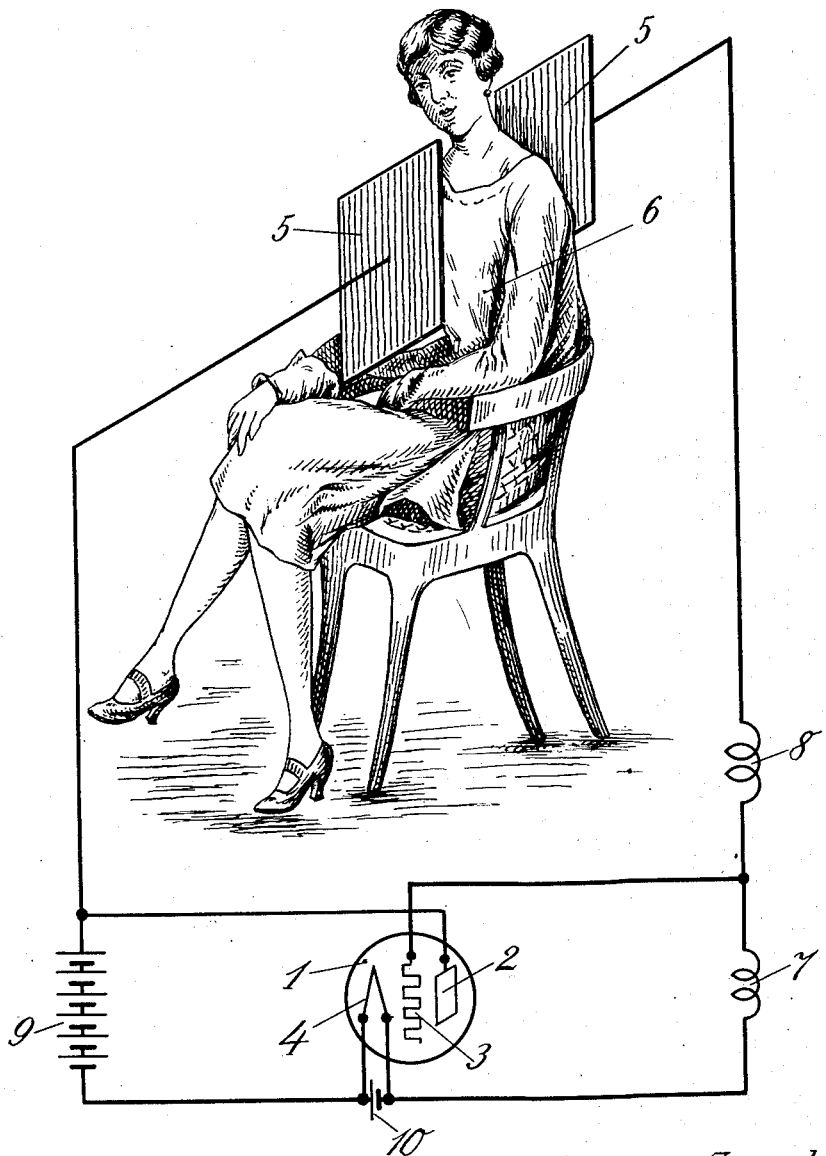

1,918,386

UNITED STATES PATENT OFFICE

ABRAHAM ESAU, OF JENA, GERMANY

APPARATUS FOR DIATHERMIC TREATMENT BY MEANS OF HIGH FREQUENCY

Application filed December 26, 1928, Serial No. 328,509, and in Germany January 21, 1928.

I have filed an application in Germany on January 21, 1928, and a second application on October 4, 1928.

With the means employed up to the present for diathermic purposes high frequency oscillations were used, which were produced either damped or not damped and whose wave length ranged from a few hundred metres up to a few thousand metres. Such treatment involves injurious action upon the surface of the members of the body treated, which becomes manifest by a more or less intense burning, i. e. deterioration of the cellular tissue. The reason for this phenomenon is that the member of the body to be treated is placed between and in direct contact with two electrodes, so that said member of the body forms a part of the circuit and acts as an ohmic resistance, and that the currents produced at these frequencies do not penetrate the human tissues to any great extent so that their action is concentrated and confined more or less to the surface portions of the human body adjacent to the electrodes. It is not only desirable to avoid these injurious actions but to generate currents which will have a more efficient action on the human tissues.

The apparatus according to the invention fulfils this requirement in that the member of the body to be treated is not allowed or required to function as an ohmic resistance, but said member is exposed directly to the action of a high frequency field, for instance, the electric alternating field of a condenser, in such a manner that air remains between the two electrodes as a dielectric, or that a further dielectric is provided, consisting for instance of glass, ebonite or other non-conducting material. Also the generated high frequency currents projected across this field penetrate the human tissues to a deeper extent, thus preventing the concentration of the heat at or in the region of the surfaces of the body and allowing deep seated disorders to be treated.

An arrangement for carrying out the invention is illustrated by way of example in the drawing, showing in diagrammatic perspective the apparatus as employed in use.

The necessary high frequency is supplied by a tube 1, connected as generator for the production of ultra short waves and possessing the usual electrodes, anode 2, grid 3 and cathode 4. The tube oscillating circuit proper is formed through the internal capacity between the anode 2 and the grid 3 and through the capacity of the condenser plates 5 serving at the same time as body treatment electrodes. 7 designates a choking coil connecting the grid 3 with the cathode 4. The cathode is fed by means of the battery 10, while the necessary voltage for the anode is supplied by the battery 9. An inductance 8 can also be inserted in the grid-cathode circuit. Owing to the back coupling of the tube between the oscillating circiut 2, 3, 8, 5 and the grid circuit proper 3, 7, 10, undamped electrical oscillations are maintained in the former, whose period of natural vibration lies within the scope of ultra-short waves on account of the slight dimensions of the inner capacities of the tube. Obviously instead of the diagram shown by way of example any other known arrangement for the generation of short waves of the length in question may be employed. The person to be subjected to the treatment is designated by 6 and is placed within the field between the condenser electrodes 5.

By the introduction of a dielectric between the condenser plates and the person treated no direct contact of the latter with the condenser plates will occur, thus obviating liability of burning of or other injury to body tissues. For carrying out the treatment short electric waves, much shorter than the waves which are employed in the normal diathermic treatment, are particularly suitable, as the desired effect is obtained in an entirely different manner than with the longer waves used up to the present. Instead of an electric field also a magnetic alternating field can be caused to act upon the member of the body to be treated, for instance the field situated within a coil through which a high frequency current is passing. Further, both fields may be used simultaneously, either separately or in the known interlinked form of the electromagnetic radiating field, where in the latter instance the energy may be preferably concentrated in known manner in the form of a directed ray upon the portions of the body to be treated.

The operation of this apparatus is such that in the field between the electrodes 5 currents of novel and peculiar effect upon the human tissues are projected. This will be understood from the fact that in the ordinary diathermic method of treatment, employing apparatus generating currents of from 1,000 to 2,000 periods, the projected currents penetrate the human tissues to but a slight extent below the skin surface only, and are more or less concentrated in their action upon the surface of the body, causing a high increase of temperature of the tissues in immediate contact with the electrodes, without any such increase of temperature being noticeable to any particular degree beneath the body surface. By the use of such apparatus, therefore, the generation of as high a degree of temperature as would be necessary to treat deep seated disorders of the tissues can not be safely carried out, because of the danger of burning the skin surface of the body. In the operation of the diathermic apparatus of this invention, however, just the opposite effect from that obtained by the use of the ordinary diathermic apparatus is produced, that is to say, the short wave currents produced in the treatment field penetrate the human tissues quite deeply, and are not concentrated or confined in their action to the surface of the body, and as a result the body tissues more or less remote from the surface may be heated for the treatment of deep seated disorders, while the temperature of the surface of the body in the region of the electrodes remains relatively low, thus obviating any liability of the burning of surface tissues with resulting ill effects. Moreover, the deep penetrating high frequency currents produced by my apparatus, as shown by long and extensive experiments, apparently have a very beneficial effect in their action on the nervous system of the patient.

Practical tests have shown that with prior apparatus and to a certain extent with the present apparatus a large amount of the energy supplied will be void of any useful effect on the human body owing to the spluttering of the electrodes unless preventive measures against such spluttering are employed, and that persons standing near commonly suffer a rise of body temperature up to one degree in the course of one hour, due to these spluttering displacement currents. This phenomenon is exceedingly disagreeable on account of the considerable loss in energy for treatment of the patient and owing to the danger to which the members of the staff attending to the apparatus are exposed.

According to the present invention these drawbacks are obviated in that the human body or part thereof exposed to the field of short waves is surrounded by a metal screen or shield 9. By this means the open field between the electrodes is converted into a closed one, possessing a slight damping. In this case there is not a screening in the ordinary sense, such as is in use in the wireless art, for preventing the entrance of disturbing waves into a device, but it is a matter of concentrating the energy of the condenser field and preventing passage of rays beyond this field and injury to operators or attendants who might be exposed for undue periods to such rays. It is immaterial whether the said screen or shield is formed of solid metal or is of a plurality of open-work construction, for example formed of parallel wires. The shield 9 may enclose the apparatus and entire body of the patient, as shown, or it may enclose the condenser plates 5 and only that part of the body which is under direct treatment at the time, as, for example, an arm or other body member, in which case the condenser plates may be made of comparatively small size and the shield can be placed close to the subject so as to concentrate the energy to a highly effective degree in the condenser field.

I claim:

1. Apparatus for diathermic treatment by means of high frequency, comprising condenser plates arranged to form a diathermic field in which the subject is to be placed between said plates and spaced therefrom, means including said plates for generating and projecting short electric waves of a length not greater than 10 metres across said field, and a metallic shield to enclose the plates and field.

2. Apparatus for diathermic treatment by means of high frequency, comprising means for generating short waves of a length not greater than 10 metres, and means for projecting the waves through a path in which the patient is disposed, said means including path terminals lying on opposite sides of that part of the path designed to be occupied by the patient.

3. Apparatus for diathermic treatment by means of high frequency, comprising a high frequency circuit for generating short waves of a length not greater than 10 metres, and means forming a field for the waves in which the patient is designed to be placed, said means including a condenser embodying terminal electrodes placed at opposite sides of the field and in spaced relation to that part of the field designed to be occupied by the patient.

4. Apparatus for diathermic treatment by means of high frequency, comprising an oscillation circuit for producing short waves of a length not greater than 10 metres, including electrodes forming with the atmosphere a magnetic field and a condenser, and dialectric material between said condenser electrodes and that part of the field designed to receive the patient.

ABRAHAM ESAU.